(12) United States Patent
Yerli

(10) Patent No.: US 12,400,381 B2
(45) Date of Patent: Aug. 26, 2025

(54) DYNAMICALLY GENERATED VIRTUAL ENVIRONMENTS

(71) Applicant: TMRW Group IP, Luxembourg (LU)

(72) Inventor: Cevat Yerli, Dubai (AE)

(73) Assignee: TMRW Group IP, Luxembourg (LU)

( * ) Notice: Subject to any disclaimer, the term of this patent is extended or adjusted under 35 U.S.C. 154(b) by 319 days.

(21) Appl. No.: 18/155,618

(22) Filed: Jan. 17, 2023

(65) Prior Publication Data

US 2024/0242405 A1 Jul. 18, 2024

(51) Int. Cl.
| | | |
|---|---|---|
| *G06T 11/00* | (2006.01) | |
| *G06F 16/9538* | (2019.01) | |
| *G06T 11/60* | (2006.01) | |

(52) U.S. Cl.
CPC .......... *G06T 11/60* (2013.01); *G06F 16/9538* (2019.01)

(58) Field of Classification Search
None
See application file for complete search history.

(56) References Cited

U.S. PATENT DOCUMENTS

| | | | |
|---|---|---|---|
| 6,002,853 A | 12/1999 | de Hond | |
| 6,199,059 B1* | 3/2001 | Dahan | G06F 16/256 707/999.102 |
| 8,131,740 B2 | 3/2012 | Cradick et al. | |
| 8,516,396 B2 | 8/2013 | Bromenshenkel et al. | |
| 10,242,032 B2 | 3/2019 | Sundaresan et al. | |
| 10,298,401 B1* | 5/2019 | Goldberg | H04L 63/02 |
| 10,357,716 B2* | 7/2019 | Tipping | A63F 13/5375 |
| 10,585,876 B2 | 3/2020 | Seo et al. | |
| 10,873,724 B1* | 12/2020 | Little | H04N 7/157 |
| 10,909,576 B1* | 2/2021 | Arivukkarasu | G06Q 30/0269 |
| 11,144,604 B1* | 10/2021 | Bourne | G06F 16/24566 |
| 11,429,679 B1* | 8/2022 | Bourne | G06F 16/434 |
| 2002/0032554 A1* | 3/2002 | Nakagawa | G06F 40/106 703/8 |
| 2003/0014437 A1* | 1/2003 | Beaumont | G06F 40/117 715/848 |
| 2003/0058238 A1* | 3/2003 | Doak | A63F 13/45 709/217 |
| 2005/0264555 A1* | 12/2005 | Zhou | G06F 3/04815 345/419 |

(Continued)

*Primary Examiner* — Martin Mushambo
(74) *Attorney, Agent, or Firm* — BRYAN CAVE LEIGHTON PAISNER LLP

(57) ABSTRACT

A system enabling dynamically generated virtual environments comprises a virtual environment creation module comprising one or more virtual environment building blocks used in the generation of at least one virtual environment, each building block comprising predefined dimensions and shapes; and a search engine configured to search one or more databases. In response to receiving a search query, the search engine retrieves, from the at least one database, data representing a plurality of virtual objects indexed based on at least one attribute associated with at least one search term and sends the data to the virtual environment creation module, which is configured to select virtual environment building blocks based on the virtual objects and to generate a virtual environment by arranging the selected virtual environment building blocks within the virtual environment and placing the virtual objects within the selected virtual environment building blocks.

20 Claims, 6 Drawing Sheets

(56) References Cited

U.S. PATENT DOCUMENTS

| | | | | |
|---|---|---|---|---|
| 2009/0094225 | A1* | 4/2009 | Cradick | G06F 16/951 |
| | | | | 707/999.005 |
| 2009/0100035 | A1* | 4/2009 | Cradick | G06F 16/907 |
| | | | | 707/999.005 |
| 2009/0144260 | A1* | 6/2009 | Bennett | G06F 16/3343 |
| | | | | 707/999.005 |
| 2010/0315431 | A1* | 12/2010 | Smith | G06T 11/20 |
| | | | | 345/619 |
| 2011/0191365 | A1* | 8/2011 | Betzler | G06F 16/00 |
| | | | | 707/769 |
| 2012/0264520 | A1* | 10/2012 | Marsland | A63F 13/533 |
| | | | | 463/43 |
| 2013/0257908 | A1* | 10/2013 | Ota | G06T 19/006 |
| | | | | 345/633 |
| 2013/0311153 | A1* | 11/2013 | Moughler | G06Q 10/047 |
| | | | | 703/6 |
| 2014/0002472 | A1* | 1/2014 | Sobeski | G09G 5/026 |
| | | | | 345/589 |
| 2014/0309926 | A1* | 10/2014 | Shimada | G01C 21/3679 |
| | | | | 701/410 |
| 2015/0332417 | A1* | 11/2015 | Haynes | G06Q 10/047 |
| | | | | 705/313 |
| 2015/0379046 | A1* | 12/2015 | Sundaresan | G06F 16/5854 |
| | | | | 707/772 |
| 2016/0253842 | A1* | 9/2016 | Shapira | G06T 19/006 |
| | | | | 345/633 |
| 2016/0260253 | A1* | 9/2016 | Reddy | G06T 15/205 |
| 2019/0254519 | A1* | 8/2019 | Garcia Ramos | A61B 3/113 |
| 2019/0318542 | A1* | 10/2019 | Sai Krishna | G06T 17/10 |
| 2020/0117212 | A1* | 4/2020 | Tian | G01C 21/206 |
| 2020/0258144 | A1 | 8/2020 | Chaturvedi et al. | |
| 2020/0302681 | A1* | 9/2020 | Totty | G06T 15/205 |
| 2021/0010823 | A1* | 1/2021 | Foligno | G01C 21/34 |
| 2022/0092846 | A1* | 3/2022 | Monti | A63F 13/355 |
| 2023/0139626 | A1* | 5/2023 | Berliner | G06F 1/1694 |
| | | | | 345/156 |

* cited by examiner

DYNAMICALLY GENERATED VIRTUAL ENVIRONMENTS

FIELD

The current disclosure relates generally computer systems. More specifically, the current disclosure relates to a system, method and computer-readable medium enabling dynamically generated virtual environments.

BACKGROUND

As situations such as the coronavirus pandemic have forced mobility restrictions worldwide, changing the way in which meeting, learning, shopping and working take place, remote collaboration and interactions, including, in particular, remote social interactions are gaining more importance. Various solutions are already available in the market to enable real-time communication and collaboration, ranging from chat applications to video telephony, such as Skype™ and Zoom™, or virtual offices for remote teams represented by 2D avatars, such as those provided by Pragli™.

Remote interactions in virtual environments using video game-type mechanics can be a solution that provides more realism than at least some of the solutions provided above. Virtual environments are simulated environments in which users may interact with one another and with virtual objects via user graphical representations, or avatars. These virtual environments may allow for different types of communications between users, such as text messages and real-time voice and/or video communications.

One industry that has been particularly affected by lockdown restrictions has been the exhibition industry, including exhibition of art pieces, museum artifacts, commercial products, etc. Some online platforms are providing already alternatives to enable virtual exhibitions. However, aspects such as the theme of the exhibitions, the layout and the selection of the exhibition objects tend to be limited to a predefined selection by one or more organizers, limiting personalization of the user experiences.

There is therefore a need for technological alternatives that can increase the degree of personalization of virtual exhibitions, providing for a customized individual or shared experience that improves the user experience and exposition rate of exhibits.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect of the current disclosure, a system enabling dynamically generated virtual environments comprises at least one server computer comprising at least one processor and memory. The memory stores a virtual environment creation module comprising virtual environment building blocks used in the generation of at least one virtual environment, each building block comprising predefined dimensions and a predefined shape. The memory further stores a search engine configured to search one or more databases. In response to receiving a search query including one or more search terms via at least one client device, the search engine retrieves, from the at least one database, data representing a plurality of virtual objects (e.g., identifiers of such objects) which are indexed based on at least one virtual object attribute associated with the one or more search terms and sends the data representing the virtual objects to the virtual environment creation module. The virtual environment creation module is configured to select at least one of the virtual environment building blocks based on the plurality of virtual objects and to generate at least one virtual environment by arranging the selected at least one virtual environment building block within the at least one virtual environment and placing the plurality of virtual objects within the selected at least one virtual environment building block.

In one embodiment, the virtual environment creation module is further configured to determine a display priority of the virtual objects and determine a layout of the at least one virtual environment based at least in part on the number and display priority of the plurality of virtual objects. In an illustrative scenario, the virtual environment creation module determines a number of relevant virtual objects to be displayed; determines a display priority of the relevant virtual objects; and determines a layout of the at least one virtual environment in view of the number and display priority of relevant virtual objects considering one or more building blocks.

In some embodiments, the at least one virtual object attribute comprises an object theme, dimensions, weight, color, shape, texture, material, historical relevance, author, year of creation, artistic/historical period, place of creation, or current location. In yet further embodiments, the search engine determines an object theme based on the one or more search terms, and the at least one virtual object attribute comprises the determined object theme. In an illustrative scenario, the search engine determines one or more predominant object themes based on the search query terms and accordingly retrieves the virtual objects. In yet further embodiments, the virtual environment creation module is further configured to determine a layout and at least one theme of the at least one virtual environment based on the determined object theme. In an illustrative scenario, the layout and at least one theme of the generated virtual environment is associated with one or more predominant object themes. In a further embodiment, the virtual environment creation module is further configured to use a diffusion model to create or modify visual content of the at least one virtual environment based on the determined object theme.

In one embodiment, the search engine is configured to request further search terms that can complement the one or more search terms. In an illustrative scenario, the further search terms complement the current provided search query terms in order to determine the one or more attributes driving the creation of the at least one virtual environment.

In some embodiments, the indexing is based on historical search data, wherein a plurality of attribute-related virtual objects are used by the virtual environment creation module to generate the at least one associated virtual environment.

In some embodiments, the virtual environment creation module generates a proposed visit route of the at least one virtual environment. In one embodiment, the proposed visit route comprises relevant virtual objects, and the virtual environment creation module further considers the proposed visit route to determine the layout of the at least one virtual environment.

In some embodiments, the at least one virtual environment enables virtual visits through user graphical representations of users accessing the virtual environments via corresponding client devices. In yet further embodiments, the system further comprises a communications module enabling communications via the user graphical representations between users. In an illustrative scenario, with the users having accessed the virtual environment, the communications module further enables users to invite other users to experience a shared experience within the virtual environment.

In some embodiments, the virtual environment creation module is further configured to save a search query and a corresponding layout of the at least one virtual environment. In an illustrative scenario, a search query and corresponding layout is saved for accessing and recreating in future sessions.

In some embodiments, each of the virtual environment building blocks comprises a predefined template determining locations for virtual objects, optical characteristics and lighting. In an illustrative scenario, each building block comprises a predefined template determining preferable spaces where virtual objects are accommodated, wherein the predefined templates comprise predefined optical characteristics and lighting that are adjusted by the characteristics of the virtual objects to be accommodated thereon.

In some embodiments, the virtual environment creation module is further configured to modify the predetermined dimensions or shape before generating the at least one virtual environment. In one embodiment, in response to a combination of building blocks not being able to accommodate at least one virtual object, the virtual environment creation module modifies the predetermined dimensions, shape, and/or other characteristics or combinations thereof of at least one building block to fit the at least one virtual object before generating the virtual environment.

In some embodiments, the at least one generated virtual environment is configured to exhibit art pieces, or museum collection pieces, or commercial exhibition pieces, or a combination thereof.

In another aspect of the current disclosure, a computer-implemented method enabling dynamically-generated virtual environments is provided, comprising: receiving, by a search engine stored in memory of a computer system, a search query including one or more search terms input via at least one client device; retrieving, by the search engine from at least one database, data representing a plurality of virtual objects indexed based on at least one virtual object attribute associated with the one or more search terms of the search query; sending the data representing the virtual objects to a virtual environment creation module stored in memory of the computer system; selecting, by the virtual environment creation module, at least one of the virtual environment building blocks based on the plurality of virtual objects; and generating, by the virtual environment creation module, at least one virtual environment by arranging the selected at least one virtual environment building block within the at least one virtual environment and placing the plurality of virtual objects within the selected at least one virtual environment building block.

In some embodiments, to generate the at least one virtual environment, in view of the one or more attributes and the at least one search query term, the virtual environment creation module further performs the steps comprising: determining a number of relevant virtual objects to be displayed; determining a display priority of the relevant virtual objects; and determining a layout of the at least one virtual environment in view of the number and display priority of relevant virtual objects.

In some embodiments, the virtual object attributes comprise one or more of an object theme, dimensions, weight, color, shape, texture, material, historical relevance, author, year of creation, artistic/historical period, place of creation, and current location. In further embodiments, the method further comprises determining by the search engine one or more predominant object themes based on the search query terms, wherein the layout and at least one theme of the generated virtual environment is associated with the one or more predominant object themes.

In some embodiments, the method further comprises requesting, by the search engine, further search terms that can complement the current provided search query terms in order to determine the one or more attributes driving the creation of the at least one virtual environment.

In some embodiments, the method further comprises indexing the virtual objects in pre-recorded playlists based on historical search data comprising a plurality of attribute-related virtual objects that are used by the virtual environment creation module to generate the at least one associated virtual environment.

In some embodiments, the method further comprises generating by the virtual environment creation module a proposed visit route of the at least one virtual environment comprising relevant virtual objects, wherein the virtual environment creation module further considers the proposed visit route to determine the layout of the at least one virtual environment.

In some embodiments, the method further comprises saving a search query and corresponding layout for accessing and recreating in future sessions.

In some embodiments, the method further comprises providing for each building block a predefined template determining preferable spaces where virtual objects are accommodated, wherein the predefined templates comprise predefined optical characteristics and lighting that are adjusted by the characteristics of the virtual objects to be accommodated thereon.

In some embodiments, the method further comprises in response to a combination of building blocks not being able to accommodate at least one virtual object, modifying by the virtual environment creation module the predetermined dimensions, shape, and/or other characteristics or combinations thereof of at least one building block to fit the at least one virtual object before generating the virtual environment.

In another aspect of the current disclosure, at least one non-transitory computer-readable medium comprising instructions which, when executed by at least one processor, cause a computer system to perform steps comprising receiving, by a search engine stored in memory of the computer system, a search query including one or more search terms input via at least one client device; retrieving, by the search engine from at least one database, data representing a plurality of virtual objects indexed based on at least one virtual object attribute associated with the one or more search terms; sending the data representing the virtual objects to a virtual environment creation module stored in memory of the computer system; selecting, by the virtual environment creation module, at least one of the virtual environment building blocks based on the plurality of virtual objects; and generating, by the virtual environment creation module, at least one virtual environment by arranging the selected at least one virtual environment building block within the at least one virtual environment and placing the plurality of virtual objects within the selected at least one virtual environment building block.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have advantages not specifically recited in the above summary. Other features and advantages of the present invention will be apparent from the accompanying drawings and from the detailed description that follows below.

BRIEF DESCRIPTION OF THE DRAWINGS

Specific features, aspects and advantages of the present disclosure will be better understood with regard to the following description and accompanying drawings, where.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

A system, method and a non-transitory computer-readable medium of the current disclosure solve at least some of the drawbacks described in the background by enabling a dynamic generation of virtual environments based on a search query from a user. The search query triggers a search engine to search one or more databases for retrieving virtual objects matching terms of the search query. The selection of the virtual objects drives the generation of a virtual environment to accommodate the virtual objects. The virtual environment is created by assembling a plurality of building blocks, which creates a layout of the virtual environment that can provide a virtual space to suitably accommodate the virtual objects and enable access to users, via corresponding user graphical representations, to the generated virtual environment. The virtual environment may be suitable for virtually exhibiting any type of objects, such as art pieces, museum collection pieces, or commercial exhibition pieces. By providing users the ability to generate custom-made virtual environments based on their search, an improved user experience is provided that can encourage more traffic to virtual exhibitions.

Figure 1:
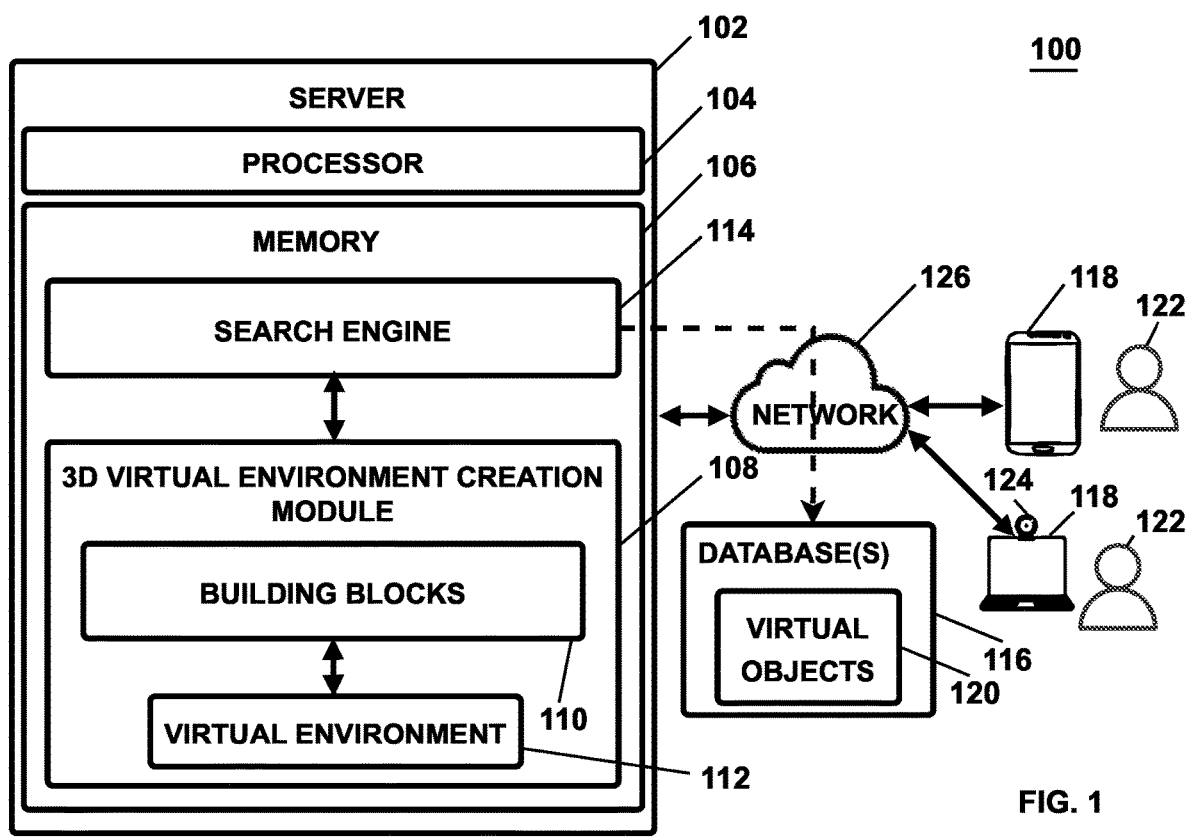
FIG. 1 depicts a schematic representation of a system to provide dynamically generated virtual environments, according to an embodiment.

FIG. 1 depicts a schematic representation of a system 100 to provide dynamically generated virtual environments, according to an embodiment.

The system 100 comprises at least one server computer 102 of a server computer system comprising at least one processor 104 and memory 106 storing a virtual environment creation module 108 comprising one or more virtual environment building blocks 110 used in the generation of at least one virtual environment 112. Each virtual environment building block 110 comprises attributes such as predefined dimensions and shapes. The system 100 further includes a search engine 114 configured to search one or more databases 116.

In response to receiving a search query including one or more search terms via at least one client device 118, the search engine 114 retrieves, from the at least one database 116, data representing a plurality of virtual objects 120 indexed based on at least one virtual object attribute associated with at least one search term and transfers the data to the virtual environment creation module 108, which uses the data to generate the at least one virtual environment 112 by accordingly organizing the virtual environment building blocks 110 to accommodate the plurality of virtual objects 120. The virtual environment creation module 108 is configured to select at least one of the virtual environment building blocks 110 based on the plurality of virtual objects 120 and to generate at least one virtual environment 112 by arranging the selected at least one virtual environment building block within the at least one virtual environment and placing the plurality of virtual objects within the selected at least one virtual environment building block 110. Thus, each virtual environment building block 110 may be assembled together and organized in order to create at least one virtual environment 112 with characteristics defined by the search query terms.

The system 100 may be used to dynamically provide virtual environments 112 for the purpose of virtually exhibiting a plurality of objects to one or more users 122. Given that the virtual environments 112 are generated based on a search query from at least one user 122, the generated virtual environments 112 are customized for the specific user 122 inputting the search query, providing an improved user experience that can encourage more traffic to, for example, virtual exhibitions.

In one embodiment, to generate the at least one virtual environment 112, in view of the one or more attributes and the at least one search query term, the virtual environment creation module 108 is further configured to determine a display priority of the virtual objects 120 and determine a layout of the at least one virtual environment 112 based at least in part on the number and display priority of the plurality of virtual objects 120. In an illustrative scenario, the virtual environment creation module 108 determines a number of relevant virtual objects 120 to be displayed. The virtual environment creation module 108 then determines a display priority of the relevant virtual objects 120. Finally, the virtual environment creation module 108 determines a layout of the at least one virtual environment 112 in view of the number and display priority of relevant virtual objects 120 considering one or more virtual environment building blocks 110. Thus, from the input terms of the search query, the search engine 114 determines attributes that may serve in the selection of a number of virtual objects 120 to be displayed within the virtual environment 112 that are used to determine a display priority that provides information for the construction of the at least one virtual environment 112.

In some embodiments, the virtual object attributes comprise one or more of an object theme, dimensions, weight, color, shape, texture, material, historical relevance score, author, year of creation, artistic/historical period, and place of creation and current location. The attributes are features that characterize each virtual object 120, and which may drive the selection of the virtual objects 120 to be displayed in the at least one virtual environment 112. For example, a virtual object 120 such as a Monalisa painting stored in at least one database can have the attributes of:

Object theme: Renaissance art
    Type: Oil painting
    Dimensions: 77 cm×53 cm
    Weight: 8.16 kg
    Color(s): Black, gray, yellow, brown
    Historical relevance score: 10/10
    Author: Leonardo Da Vinci
    Shape: Rectangular
    Year of creation: 1503 A.D.
    Artistic/historical period: Renaissance
    Place of creation: Florence
    Current location: Louvre Museum Thus, a search for "Renaissance paintings", or "famous Louvre paintings", can result in the search engine 114 retrieving the Monalisa, amongst other paintings, for display in the at least one virtual environment 112. The search engine 114 may analyze and compare the most common attributes of virtual objects 120 based on the search and retrieve the virtual objects 120 accordingly.

The databases 116 comprising the at least one virtual object 116 may, in some embodiments, belong to the companies providing the virtual objects 120. The virtual objects 116 of the current disclosure refer to a virtual version of a real-world element, which may either be mapped or modeled through computer assisted drawing (CAD) or computer-assisted engineering (CAE) methods, input by computer models of the real objects (e.g., building information models—BIMs), by using are radar-imaging, such as synthetic-aperture radars, real-aperture radars, Light Detection and Ranging (LIDAR), inverse aperture radars, monopulse radars, and other types of imaging techniques, etc. Independent of the modeling techniques used for creating the virtual replicas, the information of each virtual replica should provide sufficient details about each corresponding real-world element so that a highly accurate real-time 3D virtual replica of each real-world object is available in the databases 116 as virtual objects 120. For example, a museum owning art pieces may photograph, scan or model the art pieces so that a computer model of the corresponding art pieces is available in the databases 116. Administrators of the system 100 may also collaborate with owners of real objects for inputting the corresponding virtual objects 120 in the databases 116.

In some embodiments, the search engine 114 is configured to request further search terms that can complement the current provided search query terms in order to determine the one or more attributes that are used to define which virtual objects 120 to retrieve from the corresponding databases 116. This complementary information can be used, for example, to determine the number and display priority of the relevant virtual objects 116 driving the construction of the at least one virtual environment 112. For example, if a user 122 searches the term "wine products", the search engine 114 may analyze the search terms and analyze whether enough information is available with the provided search terms. If the search engine 114 determines that more information is required, the search engine 114 may proceed by generating and displaying text to a user 122 requesting the user 122 specific complementary data about the original search query. For example, the search engine 114 may request the user to specify whether he or she is interested in white wines, red wines, or both; whether the user is interested only in wines or also in wine utensils; whether the user is interested in wines from a specific region or determination of origin; and/or the like. A more specific search may allow for a more accurate definition of relevant parameters that drive the retrieval of the virtual objects 120 from the at least one database 116, therefore increasing the accuracy of the one or more generated virtual environments 112.

In some embodiments, the search engine 114 determines an object theme based on one or more search terms, and at least one virtual object attribute comprises the determined object theme. In an illustrative scenario, the search engine 114 determines one or more predominant object themes based on the search query terms and accordingly retrieves the virtual objects 120. A predominant object theme is the most repeated theme across a whole list of virtual objects 120 associated with a search query. In further embodiments, the virtual environment creation module 108 is further configured to determine a layout and at least one theme of the at least one virtual environment based on the determined object theme. In an illustrative scenario, the layout and at least one theme of the generated virtual environment 112 is associated with the one or more predominant object themes. For example, if a search query includes the terms "machinery" and, after a requesting further information to the user, further terms include "electric machinery for cutting metal", then the search engine 114 would determine that the predominant object theme is that of metal cutting machinery and would accordingly retrieve the corresponding virtual objects 120 related to metal cutting machinery. Then, the layout of the generated virtual environment 112 may be created to host potentially large-sized machinery using building blocks sized or shaped appropriately for such machinery, and the theme of the virtual environment 112 may be that of a commercial exhibition where metal cutting machinery is the main topic of exhibition. Decorations and lighting of each room of the at least one virtual environment 112 may also be related to the selected theme. Likewise, a predominant theme of "Renaissance art" may generate an art museum layout and corresponding renaissance theme including renaissance-style decorations.

In some embodiments, the predominant theme may further influence a musical selection of the generated virtual environment 112. For example, a "Renaissance art" predominant theme may trigger the virtual environment creation module 108 to select Renaissance-style music to play at the at least one museum virtual environment. In further embodiments, the virtual environment creation module 108 may, based on the predominant theme, add a plurality of artificial intelligence avatars to the at least one virtual environment that can add up to the ambiance of the virtual environment, wherein the dressing code of the artificial intelligence avatars is influenced by the predominant theme. For example, in a commercial exhibition, artificial intelligence avatars wearing business suits may be inserted into the virtual environment to provide a commercial exhibition ambiance, whereas a more casual dressing code may be used for a theme of a virtual art exhibition.

In some embodiments, the indexing of the virtual objects 120 is based on historical search data. For example, the virtual objects 120 may be organized in pre-recorded playlists based on historical search data comprising a plurality of attribute-related virtual objects 120 that are used by the virtual environment creation module 108 to generate the at least one associated virtual environment 112. Thus, in some embodiments, each database 116 comprises a plurality of virtual objects 120 that have been indexed according to search query terms that other users have searched in the past, resulting in a reduction of the time it may take the search engine 114 to search in the at least one database 116 for suitable virtual objects 120, to retrieve the suitable virtual objects 120, and to generate the at least one virtual environment 112, as the virtual environment creation module 108 may simply need to select from one or more prerecorded playlists.

In some embodiments, the virtual environment creation module 108 is configured to enable users to adjust a style, including decoration, colors, lighting, ambiance and sounds, amongst others, of the at least one virtual environment 112 through a suitable user graphical interface. Such options may be available before the at least one virtual environment 112 is generated by providing the user with a plurality of style-editing options, or after the creation of the at least one virtual environment 112, e.g., once the user 122 has accessed the virtual environment 120 and has had time to make an exploration thereof.

In some embodiments, the virtual environment creation module 108 further enables saving a search query and corresponding virtual environment layout for accessing and recreating in future sessions. Thus, users 122 may be able to access a previously created virtual environment 112 to continue exploring after closing a session, including all pertinent virtual objects 120 that were retrieved during the search, themes, decorations, etc.

The virtual environment creation module 108 can be implemented in various ways. In some embodiments, the virtual environment creation module 108 employs an artificial intelligence (AI) technique to perform tasks such as selecting, arranging, or modifying building blocks to construct the virtual environment 112. In some embodiments, the virtual environment creation module 108 employs AI techniques to further define the virtual environment 112 with architectural elements, wall decorations, textures, lighting features, color schemes, thematic elements, or the like. In an illustrative scenario, the virtual environment creation module 108 employs a generative neural network, such as the Stable Diffusion latent diffusion model available from Stability AI, or the DALL-E 2 diffusion model available from Open AI, to further define the virtual environment. In such a scenario, the virtual environment creation module 108 may generate output in the form of structural elements, surface textures, color schemes, wallpaper, furniture or other objects, lighting effects, or other aspects of the virtual environment 112 in response to text input. In such techniques, the text input may be obtained from various sources, such as attributes of virtual objects 120 (e.g., object theme, artist/creator, historical/artistic time period, date of creation, place of creation, etc.), user profile data, search terms, or text prompts provided by the user 122. Such AI techniques also may be used to create or modify the virtual objects 120, such as by using text input to create new or modified artworks to be displayed in the virtual environment 112. Such modifications may include techniques such as outpainting, which involves extending an original image or artwork to a larger area or "canvas" with additional content that matches the style of the original. AI techniques can be used in other ways, as well. In some cases, the virtual environment creation module 108 may, for example, analyze known user-provided scores or ratings of virtual museum experiences for existing layouts in a supervised learning approach, and use AI techniques to design future layouts that aim to maximize such scores or ratings.

In some embodiments, the virtual environment creation module 108 employs other approaches instead of or in combination with AI techniques. For example, where virtual objects 120 are implemented in standardized sizes and shapes, the virtual environment creation module 108 may use a look-up table to select a building block that has been previously determined to be a good fit based on the size and shape of corresponding virtual objects 120. The virtual environment creation module 108 also may use rule sets or rule systems to create virtual spaces, or to create branches or additions to virtual spaces based on factors such as object themes, key words, colors, artistic or historical time periods, or the like. For example, if a search query includes the term "famous oil paintings" without limitations as to historical period, a rule set may dictate that branches, wings, or rooms of the virtual environment be constructed with building blocks having thematic or architectural elements from defined historical periods, with virtual objects from those periods being added to those areas, as specified by a rule set.

The search engine 114 can be implemented in various ways. In some embodiments, the search engine 114 employs an AI-assisted search technique such as a BERT (Bidirectional Encoder Representations from Transformers) model to, e.g., identify relevant virtual objects 120. BERT is an open-source, neural-network based technology that allows training of question-answering systems. Many other approaches to search engine design may be used.

Users can interact with the search engine 114 in various ways, such by voice (e.g., speech-to-text), keyboard, or touch-screen input. In some embodiments, the search engine 114 presents to the client device 118 a graphical user interface including a query area in which a search can be generated. This graphical user interface may include any suitable interface, such as a form-based interface. A form-based interface has fields that can be filled in with text, or pop-up menus from which selections can be made, and usually has a "SEND" or "QUERY" button and a "CLEAR" or "CANCEL" button. The graphical user interface optionally comprises pull down menus. In one embodiment, the interface provides for searching at least by object theme, such as art pieces, museum artifacts, or commercial products, and may provide further options to add complementary data, if required.

In some embodiments, the at least one created virtual environment 112 enables virtual visits through user graphical representations of users 122 accessing the virtual environments 112 via corresponding client devices 118. A user graphical representation is a user avatar that may or may not resemble a user of a corresponding client device 118 and which may be used to represent the user 122 while interacting within the virtual environment 112.

In some embodiments, the user graphical representation is a user 3D virtual cutout constructed from a user-uploaded or third party-source (e.g., from a social media website) photo, or a user real-time 3D virtual cutout comprising real-time video stream of the user 122 with a removed background, or a video with removed background, or a video without removed background. In further embodiments, the client device 118 generates the user graphical representation by processing and analyzing a live camera feed of the user 122 obtained by one or more cameras 124, generating animation data that is sent to other peer client devices 118. The receiving peer client devices 118 use the animation data to locally construct and update the user graphical representation.

A user 3D virtual cutout may include a virtual replica of a user constructed from a user-uploaded or third party-source 2D photo. In an embodiment, the user 3D virtual cutout is created via a 3D virtual reconstruction process through machine vision techniques using the user-uploaded or third party-source 2D photo as input data, generating a 3D mesh or 3D point cloud of the user with removed background.

A user real-time 3D virtual cutout may include a virtual replica of the user based on the real-time 2D or 3D live video stream data feed obtained from the at least one camera 124 and after having the user background removed. In an embodiment, the user real-time 3D virtual cutout is created via a 3D virtual reconstruction process through machine vision techniques using the user live data feed as input data by generating a 3D mesh or 3D point cloud of the user with removed background. For example, the user real-time 3D virtual cutout may be generated from 2D video from a camera (e.g., a webcam) that may be processed to create a holographic 3D mesh or 3D point cloud. In another example, the user real-time 3D virtual cutout may be generated from 3D video from depth cameras (e.g., LIDARs or any depth camera) that may be processed to create a holographic 3D mesh or 3D point cloud. Thus, the user real-time 3D virtual cutout represents the user graphically in three dimensions and in real time.

A video with removed background may include a video streamed to a client device 118, wherein a background removal process has been performed so that only the user 122 may be visible and then displayed utilizing a polygonal structure on the receiving client device.

A video without removed background may include a video streamed to a client device, wherein the video is faithfully representing the camera capture, so that the user and his or her background are visible and then displayed utilizing a polygonal structure on the receiving client device. The polygonal structure can be a quad structure or more complex 3D structures used as a virtual frame to support the video.

In some embodiments, the data used as input data comprised in the live data feed and/or user-uploaded or third-party-source 2D photo comprises 2D or 3D image data, 3D geometries, video data, media data, audio data, textual data, haptic data, time data, 3D entities, 3D dynamic objects, textual data, time data, metadata, priority data, security data, positional data, lighting data, depth data, and infrared data, amongst others.

In some embodiments, the client devices 118 may be one or more of mobile devices, personal computers, game consoles, media centers, smart contact lenses, and head-mounted displays, amongst others. The cameras 124 may be one or more of a 2D or 3D camera, 360-degree camera, web-camera, RGBD camera, CCTV camera, professional camera, mobile phone camera, depth camera (e.g., LIDAR), or a light-field camera, amongst others.

In some embodiments, the client devices 118 and at least one server computer 102 connect through a wired or wireless network 126. In some embodiments, the network may include millimeter-wave (mmW) or combinations of mmW and sub 6 GHz communication systems, such as $5^{th}$ generation wireless systems communication (5G). In other embodiments, the system may connect through wireless local area networking (Wi-Fi). In other embodiments, the system may communicatively connect through $4^{th}$ generation wireless systems communication (4G), may be supported by 4G communication systems, or may include other wired or wireless communication systems.

In some embodiments, a virtual environment 112 refers to a virtual construct (e.g., a virtual model) that is composed of one or more building blocks 110. Each building block 110 may include predetermined dimensions and shapes. The virtual environments 112 are thus assembled from the building blocks 110 to accommodate a plurality of virtual objects 120.

Modules of the current disclosure, such as the search engine 114, the virtual environment creation module 108 and the at least one virtual environment 112, refer in the current disclosure to software modules comprising discrete pieces of computer code which may be independently created and maintained to be used for the purposes described herein. The modules can be distributed for and used by system 100 to use the functionality of the different modules. The software modules may be connected to corresponding hardware modules, which may be a selection of independent electronic circuits configured to provide the functions of the corresponding software modules. Through virtualization and distributed computing techniques, the modules of the current disclosure may be distributed across a plurality of computing devices, such as a plurality of server computers 102 connected to each other through the network 126.

Figure 2A:
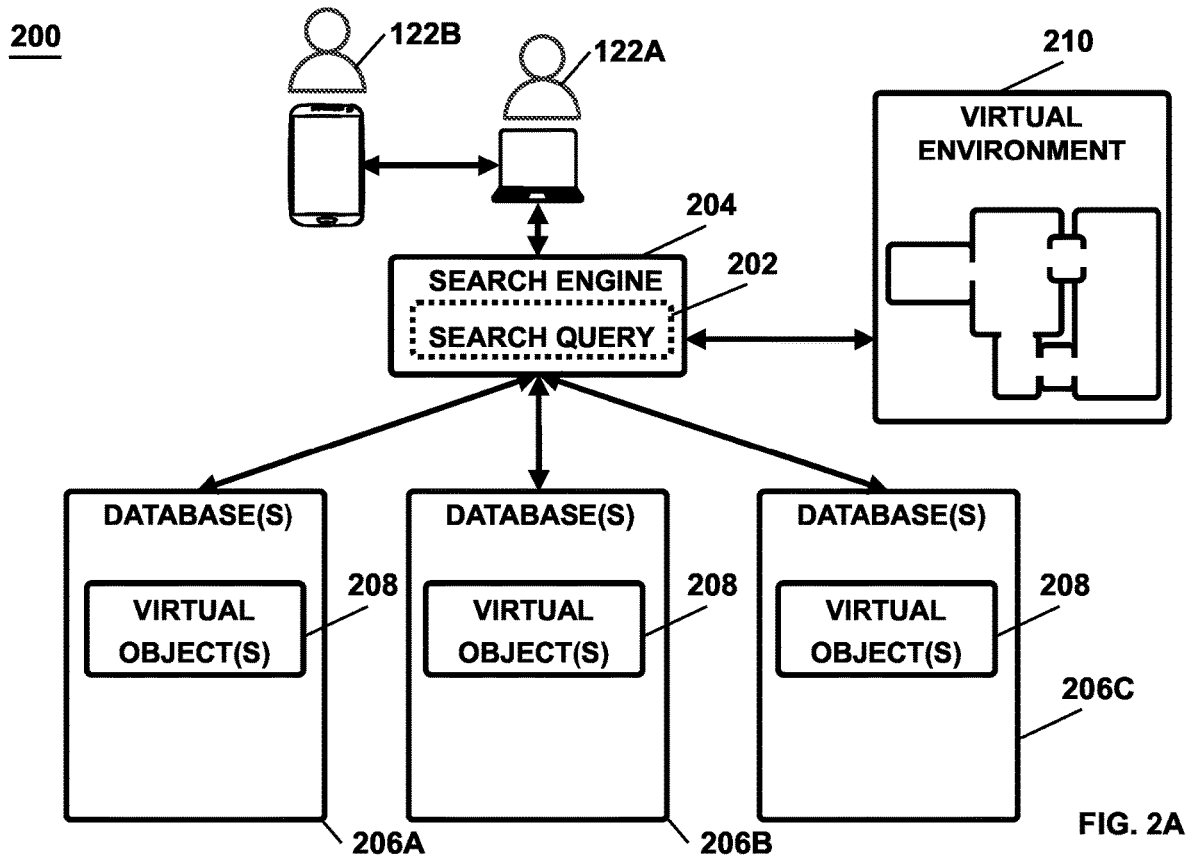
FIGS. 2A-2B depict a schematic representation of the retrieval and accommodation of virtual objects in at least one virtual environment, according to an embodiment.

FIG. 2A depicts a schematic representation of a system 200 used in the retrieval and accommodation of virtual objects in at least one virtual environment, according to an embodiment.

FIG. 2A depicts an embodiment of a system 200 enabling the retrieval and accommodation of virtual objects, where a user 122A inputs at least one term in a search query 202 through a search engine 204. The search engine 204 proceeds to search a plurality of databases, such as databases 206A-C, in order to retrieve one or more virtual objects 208. The virtual objects 208 are indexed based on at least one attribute associated with at least one search term. The search engine 204 transfers the data to the virtual environment creation module 108 described previously with reference to FIG. 1, which uses the data to generate at least one virtual environment 210 by accordingly organizing a plurality of virtual environment building blocks to accommodate the plurality of virtual objects 208.

User 122A may then access the virtual environment 210 through a user graphical representation, and invite other users, such as user 122B, for a shared experience within the virtual environment 210.

Figure 2B:
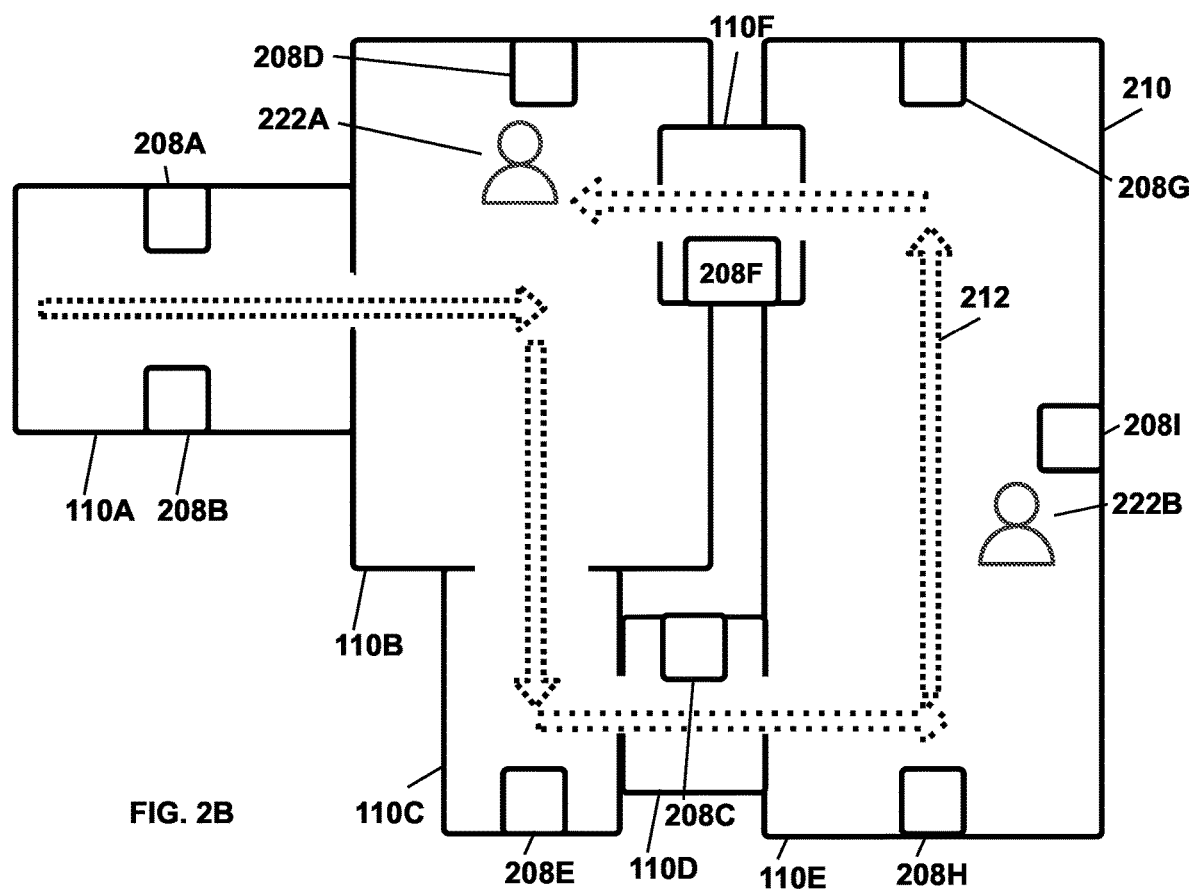

FIG. 2B depicts a closeup view of the generated virtual environment 210 where virtual objects 208A-I have been accommodated. The virtual environment creation module, based on the attributes of the retrieved virtual objects 208A-I, has generated a virtual environment 210 by assembling and organizing virtual environment building blocks 110A-F correspondingly comprising virtual objects 208A-I. More specifically, the virtual environment creation module 108 has accommodated virtual objects 208A-B on virtual environment building block 110A; virtual object 208D on virtual environment building block 110B; virtual object 208E on virtual environment building block 110C; virtual object 208C on virtual environment building block 110D; virtual objects 208G, 208H and 208I on virtual environment building block 110E; and virtual object 208F on virtual environment building block 110F. Each virtual environment building block 110A-F, after assembling into the virtual environment 210 and being provided with the corresponding theme and virtual objects 208A-I, becomes a room of the virtual environment 210 where users 122A-B (see FIG. 2A) can explore and interact through their user graphical representations 222A-B.

In some embodiments, the virtual environment creation module may assign virtual objects to the various locations according to the visibility of each location and the relative priority for each virtual object. Therefore, the virtual environment creation module may accommodate virtual objects having a relatively high priority in locations that have a higher degree of visibility to the user graphical representation, increasing the likelihood for the user to interact with higher-priority virtual objects than with lower priority virtual objects. For example, provided that virtual object 208D has a relatively high priority, the virtual environment creation module may determine to provide virtual object 208D in the center of the upper side of virtual environment building block 110B, and not in the upper right corner of virtual environment building block 110B, where virtual objects with lower relative priorities may be accommodated.

In some embodiments, the virtual environment creation module analyzes lighting conditions, optical characteristics of the display areas, and virtual object characteristics, and may accommodate the virtual objects accordingly in the virtual environment 210. The lighting characteristics refer to characteristics of lighting within different areas of the virtual environment, as light may be more concentrated or diffused depending on the specific location within the virtual environment. Optical characteristics refer to the characteristics of areas surrounding a display location with regard to their interaction with light, including refractive index, dispersion, absorption, scattering, etc. For example, if the virtual object is located behind a glass, the optical characteristics of that display area may affect the appearance of the virtual object, especially considering the type of lighting conditions within that display area of the virtual environment. Virtual object characteristics refers to attributes of the virtual objects such as size, shape, surface texture, reflectivity, or color. For example, the virtual environment creation module may determine that virtual object 208A may be more visible under the lighting conditions of virtual environment building block 110A considering virtual object 208A's characteristics, the lighting characteristics of virtual environment building block 110A, and the optical characteristics of the display area within virtual environment building block 110A, and may accordingly accommodate the virtual object 208A in a location of virtual environment building block 110A.

In some embodiments, the virtual environment creation module accommodates virtual objects in locations based on user preferences for interactions with the virtual objects. Such user preferences may be extracted from historic preferences based on previous search instances performed by the user in the past. The virtual environment creation module may then assign the virtual objects in those places where the user is more likely to interact with the virtual objects. For example, if in previous instances the user has been more likely to view and interact with virtual objects at the bottom of virtual environment building block 110E, then the virtual environment creation module may decide to put high priority virtual objects in that location.

In some embodiments, each building block comprises a predefined template determining preferable spaces where virtual objects are accommodated. For example, preferable spaces for placing virtual objects such as paintings on building block 110A may be the upper and lower sides of building block 110A as viewed in FIG. 2B, e.g., where virtual objects 208A-B have been correspondingly accommodated. In further embodiments, the predefined templates comprise predefined optical characteristics and lighting that can be adjusted by the characteristics of the virtual objects to be accommodated thereon. However, as detailed with regard to FIG. 1, the virtual environment creation module 108 also enables adjustment of conditions such as lighting of each of the rooms of the virtual environment.

In some embodiments, the virtual environment creation module 108 is further configured to modify the predetermined dimensions or shape before generating the at least one virtual environment 210. In one embodiment, in response to a combination of building blocks not being able to accommodate at least one virtual object, the virtual environment creation module modifies the predetermined dimensions, shape, and/or other characteristics or combinations thereof of at least one building block to fit the at least one virtual object before generating the virtual environment. For example, if the dimensions of virtual objects 208A-I were too large to suitably fit within the dimensions of the selected building blocks 110A-F, the virtual environment creation module may accordingly modify the dimensions of building blocks 110A-F to enable them to accommodate the virtual objects.

In some embodiments, the at least one virtual environment 210 is hosted as part of a videoconferencing platform enabling video communications between users, such as users 122A-B. The videoconferencing platform comprises a communications module enabling communications between users via user graphical representations, such as user graphical representations 222A-B. The communications module further enables users to invite other users to experience a shared experience within the at least one virtual environment. For example, user 122A may have been the creator of virtual environment 210 by having made a search query. Once the virtual environment 210 has been generated, then the user 122A may have invited the user 122B through the communications module. The videoconferencing platform, through the virtual environment 210, may enable a plurality of social interactions such as chatting, screen sharing, participant, sending or receiving multimedia files, hand-raising, preparation of meeting-summaries, moving objects, playing games, performing transactions, engaging in private or group conversations, and/or the like. Such a videoconferencing platform may use any suitable system architecture to enable communications in virtual environments, such as one of the WebRTC architectures, including a peer-to-peer (P2P) architecture, a selective forwarding unit (SFU) architecture, a media combining unit (MCU) architecture, amongst others.

The virtual environment 210 may enable sharing in real-time a plurality of experiences, such as customized exhibitions of art pieces, museum collection pieces, commercial exhibition pieces, or a combination thereof, where users 122A-B, through their corresponding user graphical representations 222A-B, may explore the exhibitions and may interact with elements of the virtual exhibitions as well as with other users. These virtual exhibitions may be multi-casted to a plurality of instances of a virtual environment 210 to accommodate a large number of users from various parts of the world. For example, if an exhibition organizer creates at least one virtual environment in order to host a virtual exhibition, the organizer may invite a plurality of users from any part of the world. The virtual environment 210 is then multicast to the different client devices of invitees enabling users to share the virtual experiences within the virtual environment 210.

In some embodiments, the virtual environment creation module generates a proposed visit route 212 of the at least one virtual environment 210 comprising relevant virtual objects 208A-G. In further embodiments, the virtual environment creation module 108 considers the proposed visit route 212 to determine the layout of the at least one virtual environment 210. This embodiment may be implemented after selection of suitable virtual objects to be included in the at least one virtual environment 210. For example, in the illustration of FIG. 2B, the proposed visit route 212 starts on virtual environment building block 110A to enable users to view virtual objects 208A-B, then continues on to virtual environment building blocks 110B and 110C, enabling users to view virtual object 208E, then continues on to virtual environment building block 110D to enable users to view virtual object 208C, then moves on to virtual environment building block 110E to enable users to view virtual objects 208H, 208I and 208G, then continues through virtual environment building block 110F to enable users to view virtual object 208F, and may end on virtual environment building block 110B to view object 208D. The proposed visit route 212 may be clearly marked on the floor of the at least one virtual environment for proposing the route to users. However, users may be free to follow the proposed visit route 212 or to explore in any order of their preference.

Figure 3:
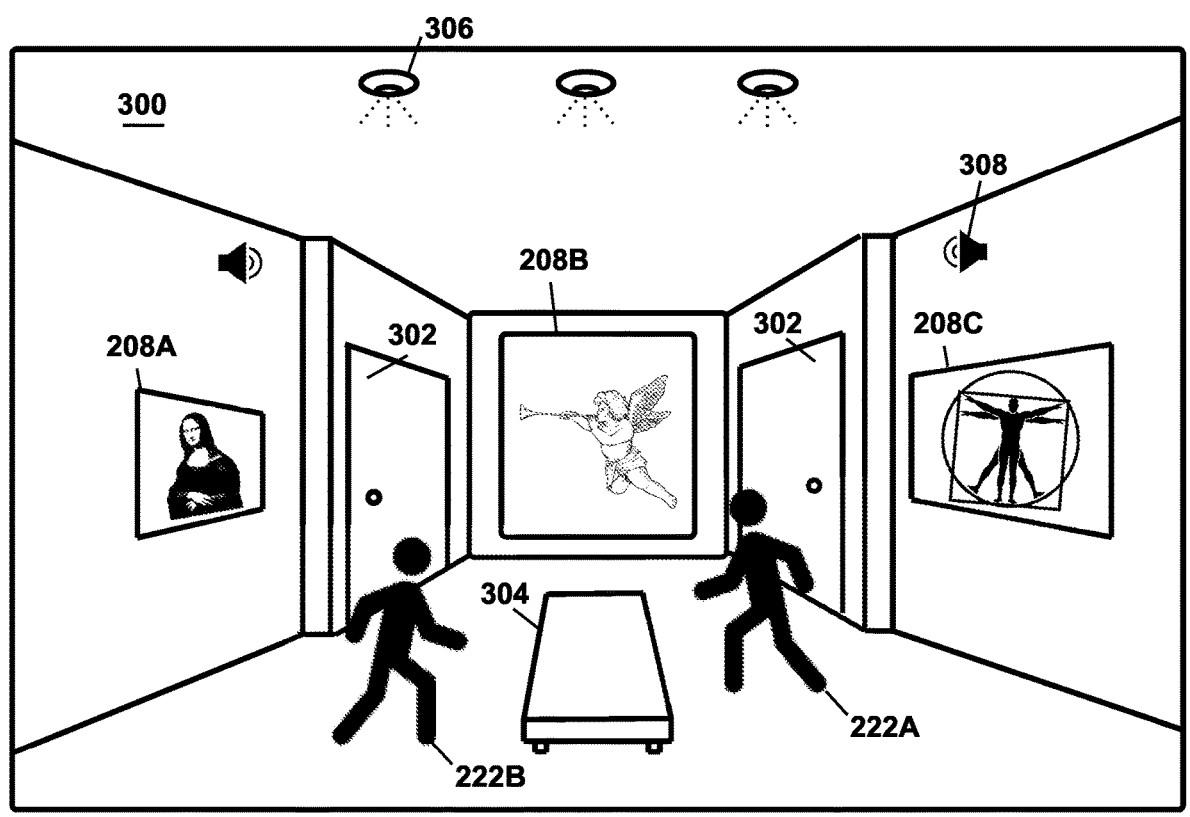
FIG. 3 depicts a schematic representation illustrating an art gallery, according to an embodiment.

FIG. 3 depicts a schematic representation illustrating a room 300 of a virtual art gallery, according to an embodiment. The room 300 is part of a virtual environment generated through a virtual environment creation module of a system enabling dynamically generated virtual environments, such as systems 100-200 depicted in FIGS. 1-2A. The room 300 of the virtual art gallery is thus one of many virtual environment building blocks generated in response to a search query from, for example, a user A, which theme has been selected to match the theme of the search query.

In the current example, the room 300 was created through the search query terms "Renaissance art", therefore, the retrieved and accommodated art pieces 208A-C all match the searched theme. In this example, art piece 208A is the Monalisa, art piece 208B is a cherub, and art piece 208C is the Vitruvian Man. User 122A may explore the room 300 through a user graphical representation 222A and may also invite a user 122B to experience the room 300 through a corresponding user graphical representation 222B. Users 122A and 122B may also interact with each other and with virtual objects 208A-C or other elements in the room through their corresponding user graphical representations 222A-B.

The room 300 may be one of several rooms of the virtual art gallery, where each room is a building block that was assembled as part of the virtual art gallery. Thus, the virtual art gallery may include other areas, separated in FIG. 3 by doors 302, and each area may provide access to other virtual objects falling within the theme of the search query, i.e., Renaissance art. However, if the search had been broader, such as "famous oil paintings", the other rooms of the virtual environment may have been populated by art pieces from different times and styles, where each room may preferably but is not limited to include one theme related to "famous oil paintings".

The room 300 further includes other elements, such as benches 304, lights 306, etc., matching the theme of the room 300, in this case, for an art gallery. The room 300 further includes speakers 308 providing audio matching the ambience of the room 300, such as classical music, which can also be adjusted by the users.

Figure 4:
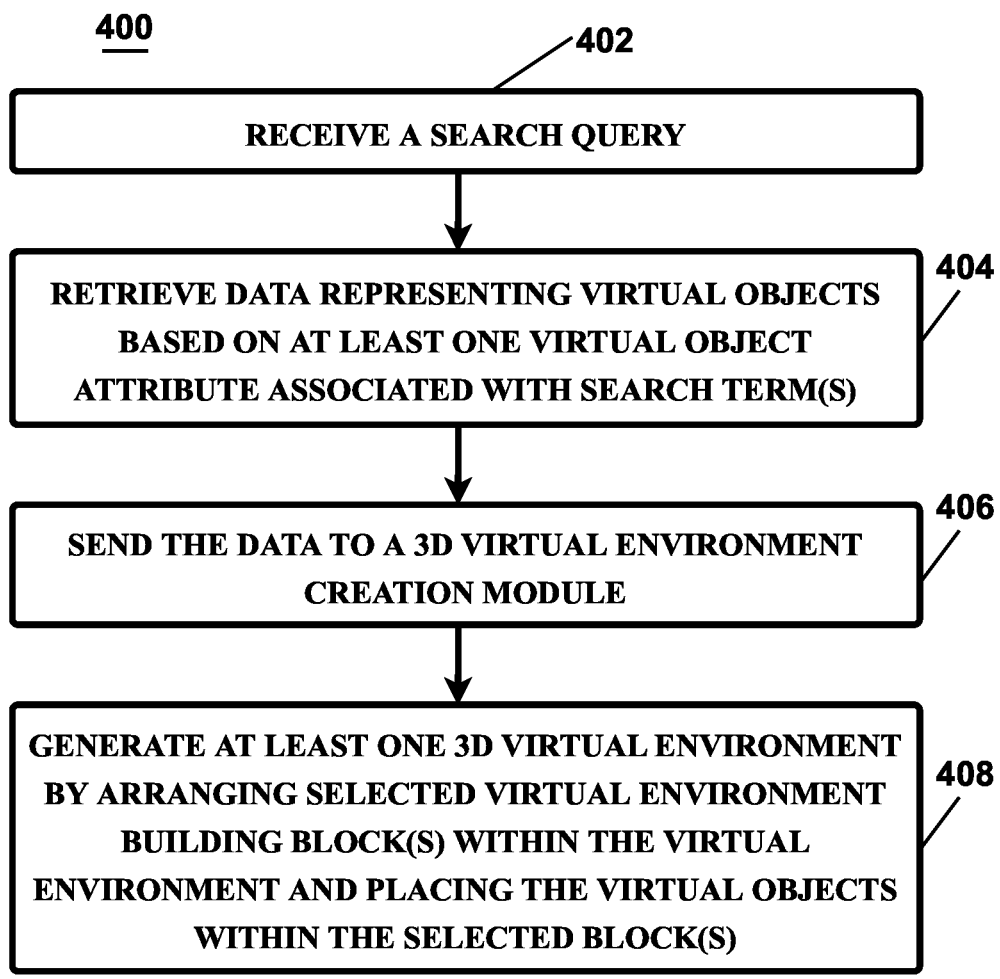
FIG. 4 depicts a block diagram of a method to provide dynamically generated virtual environments, according to an embodiment.

FIG. 4 depicts a block diagram of a method 400 to provide dynamically generated virtual environments, according to an embodiment.

Method 400 may be implemented by a system, such as systems 100-200 described with reference to FIGS. 1-2A. Method 400 begins in step 402 by receiving, by a search engine stored in memory of at least one server computer, a search query including one or more search terms input via at least one client device. Then, in step 404, the method proceeds by retrieving, by the search engine from at least one database storing a plurality of virtual objects categorically indexed based on at least one attribute, data representing a plurality of virtual objects associated with at least one term of the search query. In step 406, the method continues by transferring the data to a virtual environment creation module stored in memory of the at least one server computer. Finally, in step 408, the method 400 ends by generating, by the virtual environment creation module, at least one 3D virtual environment by arranging one or more selected virtual environment building blocks within the 3D virtual environment and placing the virtual objects within the selected building block(s).

Figure 5:
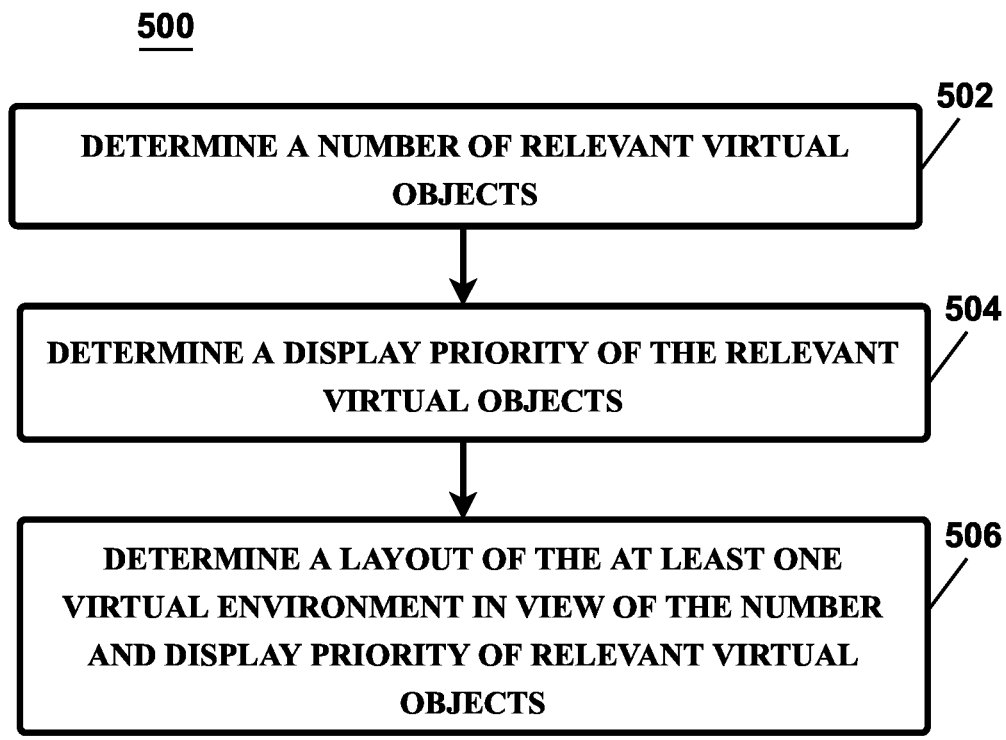
FIG. 5 depicts a block diagram detailing further steps of the method to provide dynamically generated virtual environments, describing a method to generate at least one virtual environment.

FIG. 5 depicts a block diagram of a method 500 detailing further steps that may be performed in combination with the method 400 to provide dynamically generated virtual environments, and in particular, to determine a display priority of virtual objects and determine a layout of at least one virtual environment based at least in part on the number and display priority of the virtual objects.

Method 500 begins in step 502 by determining a number of relevant virtual objects to be displayed. Then, in step 504, the method proceeds by determining a display priority of the relevant virtual objects. Finally, in step 506, the method ends by determining a layout of the at least one virtual environment in view of the number and display priority of relevant virtual objects.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

The invention claimed is:

1. A system comprising:
   at least one server computer comprising at least one processor and memory storing:
   a virtual environment creation module comprising a plurality of virtual environment building blocks, each of the virtual environment building blocks comprising predefined dimensions and a predefined shape and providing a virtual space within a virtual environment to suitably accommodate at least one virtual object; and
   a search engine configured to search one or more databases;
   wherein, the search engine is configured to retrieve from the one or more databases, in response to receiving a search query including one or more search terms via at least one client device, data representing the at least one virtual object indexed based on at least one virtual object attribute associated with the one or more search terms and to send the data representing the at least one virtual object to the virtual environment creation module, and
   wherein the virtual environment creation module is configured to select at least one of the virtual environment building blocks based on its predefined dimensions and predefined shape and the at least one virtual object and to generate at least one virtual environment by arranging the selected at least one virtual environment building block within the at least one virtual environment and placing the at least one virtual object within the selected at least one virtual environment building block.

2. The system of claim 1, wherein the virtual environment creation module is further configured to:
   determine a display priority of the at least one virtual object; and determine a layout of the at least one virtual environment based at least in part on a number and display priority of the at least one virtual object.

3. The system of claim 1, wherein the at least one virtual object attribute comprises an object theme, dimensions, weight, color, shape, texture, material, historical relevance, author, year of creation, artistic/historical period, place of creation, or current location.

4. The system of claim 1, wherein the search engine determines an object theme based on the one or more search terms, and wherein the at least one virtual object attribute comprises the determined object theme.

5. The system of claim 4, wherein the virtual environment creation module is further configured to determine a layout and at least one theme of the at least one virtual environment based on the determined object theme.

6. The system of claim 4, wherein the virtual environment creation module is further configured to use a diffusion model to create or modify visual content of the at least one virtual environment based on the determined object theme.

7. The system of claim 1, wherein the search engine is configured to request further search terms that complement the one or more search terms.

8. The system of claim 1, wherein said indexing is based on historical search data, and wherein a plurality of attribute-related virtual objects are used by the virtual environment creation module to generate the at least one virtual environment.

9. The system of claim 1, wherein the virtual environment creation module generates a proposed visit route of the at least one virtual environment.

10. The system of claim 1, wherein the at least one virtual environment enables virtual visits through user graphical representations of users accessing the at least one virtual environment via corresponding client devices, the system further comprising a communications module enabling communications via the user graphical representations between users.

11. The system of claim 1, wherein the virtual environment creation module is further configured to save the search query and a corresponding layout of the at least one virtual environment.

12. The system of claim 1, wherein each of the virtual environment building blocks comprises a predefined template determining locations for virtual objects, optical characteristics and lighting.

13. The system of claim 1, wherein the virtual environment creation module is further configured to modify the predefined dimensions or the predefined shape before generating the at least one virtual environment.

14. A computer-implemented method comprising:
receiving, by a search engine stored in memory of a computer system, a search query including one or more search terms input via at least one client device;
retrieving, by the search engine from at least one database, data representing at least one virtual object indexed based on at least one virtual object attribute associated with the one or more search terms of the search query;
sending the data representing the at least one virtual object to a virtual environment creation module stored in the memory of the computer system;
selecting, by the virtual environment creation module, at least one virtual environment building block based on its predefined dimensions and a predefined shape and the at least one virtual object; and
generating, by the virtual environment creation module, at least one virtual environment by arranging the selected at least one virtual environment building block within the at least one virtual environment and placing the at least one virtual object within the selected at least one virtual environment building block, wherein the at least one virtual environment building block provides a virtual space within the virtual environment to suitably accommodate the at least one virtual object.

15. The method of claim 14 further comprising:
determining a display priority of the at least one virtual object; and
determining a layout of the at least one virtual environment based at least in part on a number and display the at least one virtual object.

16. The method of claim 15, further comprising generating by the virtual environment creation module a proposed visit route of the at least one virtual environment.

17. The method of claim 15, wherein the at least one virtual object attribute comprises an object theme, dimensions, weight, color, shape, texture, material, historical relevance, author, year of creation, artistic/historical period, place of creation, or current location.

18. The method of claim 17, further comprising determining an object theme based on the one or more search terms, and determining a layout and at least one theme of the at least one virtual environment based on the determined object theme.

19. At least one non-transitory computer-readable medium comprising instructions which, when executed by at least one processor, cause a computer system to perform steps comprising:
receiving, by a search engine stored in memory of the computer system, a search query including one or more search terms input via at least one client device;
retrieving, by the search engine from at least one database, data representing at least one virtual object indexed based on at least one virtual object attribute associated with the one or more search terms;
sending the data representing the at least one virtual object to a virtual environment creation module stored in the memory of the computer system;
selecting, by the virtual environment creation module, at least one virtual environment building block based on its predefined dimensions and a predefined shape and the at least one virtual object; and
generating, by the virtual environment creation module, at least one virtual environment by arranging the selected at least one virtual environment building block within the at least one virtual environment and placing the at least one virtual object within the selected at least one virtual environment building block, wherein the at least one virtual environment building block provides a virtual space within the virtual environment to suitably accommodate the at least one virtual object.

20. The non-transitory computer-readable medium of claim 19, the steps further comprising:
determining a display priority of the at least one virtual object; and
determining a layout of the at least one virtual environment based at least in part on a number and display priority of the at least one virtual object.

* * * * *